United States Patent
Tarditi, Jr. et al.

(10) Patent No.: US 7,512,938 B2
(45) Date of Patent: Mar. 31, 2009

(54) TYPED INTERMEDIATE REPRESENTATION FOR OBJECT-ORIENTED LANGUAGES

(75) Inventors: David Read Tarditi, Jr., Kirkland, WA (US); Juan Chen, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 583 days.

(21) Appl. No.: 11/084,476

(22) Filed: Mar. 18, 2005

(65) Prior Publication Data

US 2006/0212861 A1    Sep. 21, 2006

(51) Int. Cl.
*G06F 9/45* (2006.01)
(52) U.S. Cl. ...................................................... 717/146
(58) Field of Classification Search ................. 717/140, 717/141, 143, 146
See application file for complete search history.

(56) References Cited

U.S. PATENT DOCUMENTS

| | | | | |
|---|---|---|---|---|
| 6,067,577 | A * | 5/2000 | Beard | 719/331 |
| 6,560,774 | B1 * | 5/2003 | Gordon et al. | 717/146 |
| 6,718,336 | B1 * | 4/2004 | Saffer et al. | 707/102 |
| 6,981,249 | B1 * | 12/2005 | Knoblock et al. | 717/141 |
| 7,086,041 | B2 * | 8/2006 | Plesko et al. | 717/141 |
| 7,146,606 | B2 * | 12/2006 | Mitchell et al. | 717/141 |
| 7,197,747 | B2 * | 3/2007 | Ishizaki et al. | 717/146 |
| 7,305,666 | B2 * | 12/2007 | Burger et al. | 717/140 |
| 2004/0268307 | A1 * | 12/2004 | Plesko et al. | 717/114 |
| 2005/0015673 | A1 * | 1/2005 | Plesko et al. | 714/38 |
| 2007/0169040 | A1 * | 7/2007 | Chen | 717/146 |

OTHER PUBLICATIONS

Todd B. Knoblock et al., "Type Elaboration and Subtype Completion for Java Bytecode", ACM Transactions on Programming Languages and Systems (TOPLAS), pp. 243-272, Mar. 2001. http://delivery.acm.org/10.1145/390000/383045/p243-knoblock.pdf?key1=383045&key2=6827803021&coll=ACM&dl=ACM&CFID=54854322&CFTOKEN=12759830.*
Joseph C. Vanderwaart, "Typed Intermediate Representation for Compiling Object-Oriented Languages", Williams College, May 24, 1999, pp. 1-84.*

(Continued)

*Primary Examiner*—Wei Y Zhen
*Assistant Examiner*—Chih-Ching Chow
(74) *Attorney, Agent, or Firm*—Klarquist Sparkman, LLP (57) ABSTRACT

Described herein are typed intermediate representations of object-oriented source code that preserve notions of class names, as well as add structure-based information related to classes in the source code. Types in the intermediate representation are divided into corresponding class name-based types and associated structure-based record types. The structure-based record type comprises a layout of objects that are instances of the corresponding class name-based types, where the object comprises one or more data fields and one or more virtual method members. Dynamic types can be abstracted in the form of existential types with sub-classing bounded quantifications. This makes type checking decidable. Existential types bind type variables with sub-classing bounds to represent dynamic types of objects. The layout of those objects can be approximated by structure-based record types. The types of virtual methods in the approximation record types include type variables that represent the dynamic types of those objects to guarantee safety.

18 Claims, 9 Drawing Sheets

OTHER PUBLICATIONS

Abadi et al., "An interpretation of objects and object types," In *ACM Symposium on Principles of Programming Languages*, pp. 396-409, St. Petersburg Beach, Florida, 1996.

Baldan et al., "Basic theory of f-bounded quantification," *Information and Computation*, vol. 153, No. 1, pp. 173-237, Pisa, Italy, 1999.

Bruce et al., "Safe and Decidable Type Checking in an Object-Oriented Language." In *the 8th Annual conference on Object-Oriented Programming Systems, Languages, and Applications*, ACM Press, pp. 29-46, 1993.

Bruce, Kim B., "A paradigmatic object-oriented programming language: Design, static typing and semantics," *Journal of Functional Programming*, vol. 4, No. 2, pp. 127-206, Apr. 1994.

Canning et al., "F-Bounded Quantification for Object-Oriented Programming," In *Fourth International Conference on Functional Programming Languages and Computer Architecture*, pp. 273-280, 1989.

Cardelli et al., "On Understanding Types, Data Abstraction, and Polymorphism," *ACM Computing Surveys*, vol. 17, No. 4, pp. 471-522, Dec. 1985.

Cardelli, Luca, "A Semantics of Multiple Inheritance," *Information and Computation*, pp. 138-164, Feb./Mar. 1988.

Castagna et al., "Corrigendum: Decidable Bounded Quantification," ACM, one page, Jan. 1994.

Castagna et al., "Decidable Bounded Quantification," In *21st ACM Symposium on Principles of Programming Languages*, ACM Press, pp. 151-162, 1994.

Colazzo et al., "Subtyping Recursive Types in Kernel Fun," In *Logic in Computer Science*, pp. 137-146, 1999.

Colby et al., "A Certifying Compiler for Java," In *ACM SIGPLAN Conference on Programming Language Design and Implementation*. ACM Press, pp. 1-13, Jun. 2000.

Cook et al., "Inheritance is Not Subtyping" In *17th ACM Symposium on Principles of Programming Languages*, pp. 125-135, ACM Press, 1990.

Crary, Karl, "Simple, Efficient Object Encoding Using Intersection Types. Technical report," CMU Technical Report CMU-CS-99-100, pp. 1-18, Jan. 1999.

Ghelli et al., "Bounded Existentials and Minimal Typing," *Theoretical Computer Science*, pp. 75-96, 1998.

Ghelli, Giorgio, "Divergence of F$\leq$ Type Checking," *Theoretical Computer Science*, pp. 131-162, 1995.

Ghelli, Giorgio, "Recursive Types Are Not Conservative Over F$\leq$," In *Proceedings of the International Conference on Typed Lambda Calculi and Applications*, pp. 146-162, Springer-Verlag, 1993.

Glew, Neal, "An Efficient Class and Object Encoding," In *ACM SIGPLAN Conference on Object-Oriented Programming, Systems, Languages, and Applications*, pp. 311-324, 2000.

Glew, Neal, "Type Dispatch For Named Hierarchical Types," In *ACM SIGPLAN International Conf. on Functional Programming*, pp. 172-182, Sep. 1999.

Igarashi et al., "Featherweight Java: A Minimal Core Calculus for Java and GJ," *ACM Trans. on Programming Languages and Systems*, vol. 23m, No. 3, pp. 396-450, May 2001.

Kamin, S., "Inheritance in Smalltalk-80: A Denotational Definition," In *15th ACM Symposium on Principles of Programming Languages*, ACM Press, pp. 80-87, 1988.

Katiyar et al., "Completely Bounded Quantification in Decidable," In *Proceedings of the ACM SIGPLAN Workshop on ML and its Applications*, 1992.

League et al., "Type-Preserving Compilation of Featherweight Java," *ACM Trans. on Programming Languages and Systems*, vol. 24, No. 2, 27 pages Mar. 2002.

League, Christopher, "A Type-Preserving Compiler Infrastructure," Ph.D Thesis, Yale University, 129 pages, 2002.

Morrisett et al., "From System F to Typed Assembly Language," *ACM Trans. on Programming Languages and Systems*, vol. 21, No. 3, pp. 527-568, May 1999.

Necula, George, "Proof-Carrying Code," In *ACM Symposium on Principles of Programming Languages*, ACM Press, pp. 106-119, 1997.

Pierce et al., "Intersection Types and Bounded Polymorphism," In *Typed Lambda Calculi and Applications*, vol. 664, pp. 346-360, Springer-Verlag, 1993.

Pierce et al., "Simple Type-Theoretic Foundations For Object-Oriented Programming," *Journal of Functional Programming*, vol. 4, No. 2, pp. 207-247, Apr. 1994.

Pierce, Benjamin C., "Bounded Quantification is Undecidable," In *Theoretical Aspects of Object-Oriented Programming: Types, Semantics, and Language Design*, pp. 427-459, 1994.

R'emy, Didier, "Programming Objects with ML-ART, An Extension To ML With Abstract And Record Types," In *International Conference on Theoretical Aspects of Computer Software*, pp. 321-346, 1994.

Shao, Zhong, "An Overview Of The FLINT/ML Compiler," In *ACM SIGPLAN Workshop on Types in Compilation*, pp. 1-10, Jun. 1997.

Tarditi et al., "TIL: A Type-Directed Optimizing Compiler For ML," In *ACM SIGPLAN Conference on Programming Language Design and Implementation*, 12 pages, 1996.

Vorobyov, Sergei G., "Structural decidable Extensions of Bounded Quantification," In *Proceedings of the 22nd ACM SIGPLAN-SIGACT Symposium on Principles of Programming Languages*, pp. 164-175, California, 1995.

Wright et al., "A Syntactic Approach To Type Soundness," *Information and Computation*, vol. 115, No. 1, pp. 38-94, 1994.

Wright et al., "Compiling Java To A Typed Lambda-Calculus: A Preliminary Report," In *Types in Compilation*, pp. 9-27, 1998.

Xi et al., "Guarded Recursive Datatype Constructors," In *ACM SIGPLAN Symposium on Principles of Programming Languages*, pp. 224-235, New Orleans, Jan. 2003.

* cited by examiner

TYPED INTERMEDIATE REPRESENTATION FOR OBJECT-ORIENTED LANGUAGES

TECHNICAL FIELD

The field relates to compiling computer programs to intermediate language representations. More particularly, the field relates to compiling object-oriented source code to typed intermediate language representations.

BACKGROUND

Compilers transform programs from high-level programming languages to machine code by a series of steps. At each stage in compilation, an intermediate language can be defined to represent programs at that stage. At each new stage, the corresponding intermediate language representation exposes more details of the computation than the previous stage up to the point where machine code is reached. Maintaining information regarding types within such intermediate representations has significant benefits. For instance, a typed intermediate language allows intermediate program representations to be type-checked and, thus, can be used to debug compilers, to guide optimizations, and to generate safety proofs for programs. Furthermore, typed intermediate representations can be used as a format for redistributing programs and a user can (mechanically) check that the program redistributed in the intermediate form is safe to run, as opposed to relying on certificates or third party claims of trustworthiness.

In practice, however, compilers for object-oriented languages do not maintain enough type information in low-level intermediate representations so programs in those representations can be typechecked, even though their input is statically typed. One reason, compilers for object-oriented languages have failed to adopt compilation using typed intermediate representations is the complexity related to the traditional class and object encodings used in previous approaches to obtaining typed intermediate representations for object-oriented languages compilation methods. A great deal of work has been done for developing typed intermediate languages for functional languages, but much of this work does not support object-oriented programming languages, which are widely used in practice (e.g., C#, C++, and JAVA. JAVA is a trademark of Sun Microsystems, Inc.). Thus far, those typed intermediate languages that have been proposed for object-oriented languages are complicated, often inefficient, and do not allow compilers to use standard implementation techniques. In short, they are not suitable for practical compilers.

A practical compiler requires simple, general, and efficient type systems. First, compiler writers who are not type theorists should be able to understand the type system. Second, the type system needs to cover a large set of realistic object-oriented language features and compiler transformations. Third, the type system needs to express standard implementation techniques without introducing extra runtime overhead. To enable any of the above at the intermediate language level, methods and systems are needed to maintain type information in the intermediate language compiled from a source code representation.

SUMMARY

Described herein are methods and systems for generating typed intermediate representations of source code written in an object-oriented language (e.g., JAVA, C# and C++), wherein typechecking for the typed intermediate representations is decidable. In one aspect, class name-based information related to one or more classes defined in the source code representation are retained in the intermediate representation instead of being discarded during compilation. The class name-based information retained comprises a precise class name in the intermediate form. An associated record type comprising the runtime data representation (e.g., layout) of one or more objects of the class is also added to the intermediate representation.

In a further aspect, the typed intermediate representation comprises coercions between objects of the precise class name and records of the record type associated therewith. In one aspect, retaining the class name-based information in the typed intermediate representation allows for the sub-classing relationships between classes to be expressed in the intermediate form. The class names in the typed intermediate representation are precise and used to indicate that values that a code portion such as an expression or variable may have at runtime are exactly objects of that class. This is in contrast to source-code level class names where values that an expression or variable may have at runtime may be objects of the class or its subclasses, for instance.

In another aspect, the typed intermediate representation comprises existential types with sub-classing bounded type variables to express objects whose dynamic types (that is, types at runtime) are unknown at compile time in the intermediate form. In another aspect, type checking is made decidable by providing sub-classing bounds to type variables in quantified types. The existential types bind type variables that identify the dynamic types of objects. The layout of those objects is approximated at compile time by record types. Each approximated record type is based on an object layout related to a known class, wherein the known class is also a super class of the dynamic type of an object.

In another aspect, the typed intermediate representation comprises existential types with sub-classing bounded type variables to express that values that a code portion in an intermediate representation (e.g., expression or variable) may have at runtime are objects whose dynamic types (that is, types at runtime) are unknown at compile time in the intermediate form. In another aspect, type checking is made decidable by providing sub=classing bounds to type variables in quantified types. The existential types bind type variables that identify the dynamic types of objects. Record types approximate the layout of those objects at compile time. Each approximated record type is based on an object layout related to a known class, wherein the known class is also a super class of the dynamic type of an object.

In a further aspect, the approximated record type includes types for virtual methods, wherein the type of one of the arguments of each method is an existential type that binds a type-variable whose sub-classing bounds depends on the dynamic type of an object. In this way, dynamic dispatch involving objects whose runtime types are unknown at compile time in the intermediate representation can be ensured to be safe.

Additional features and advantages will become apparent from the following detailed description of illustrated embodiments, which proceeds with reference to accompanying drawings.

DETAILED DESCRIPTION

Overall System for Type-checking Intermediate Representations

Figure 1:
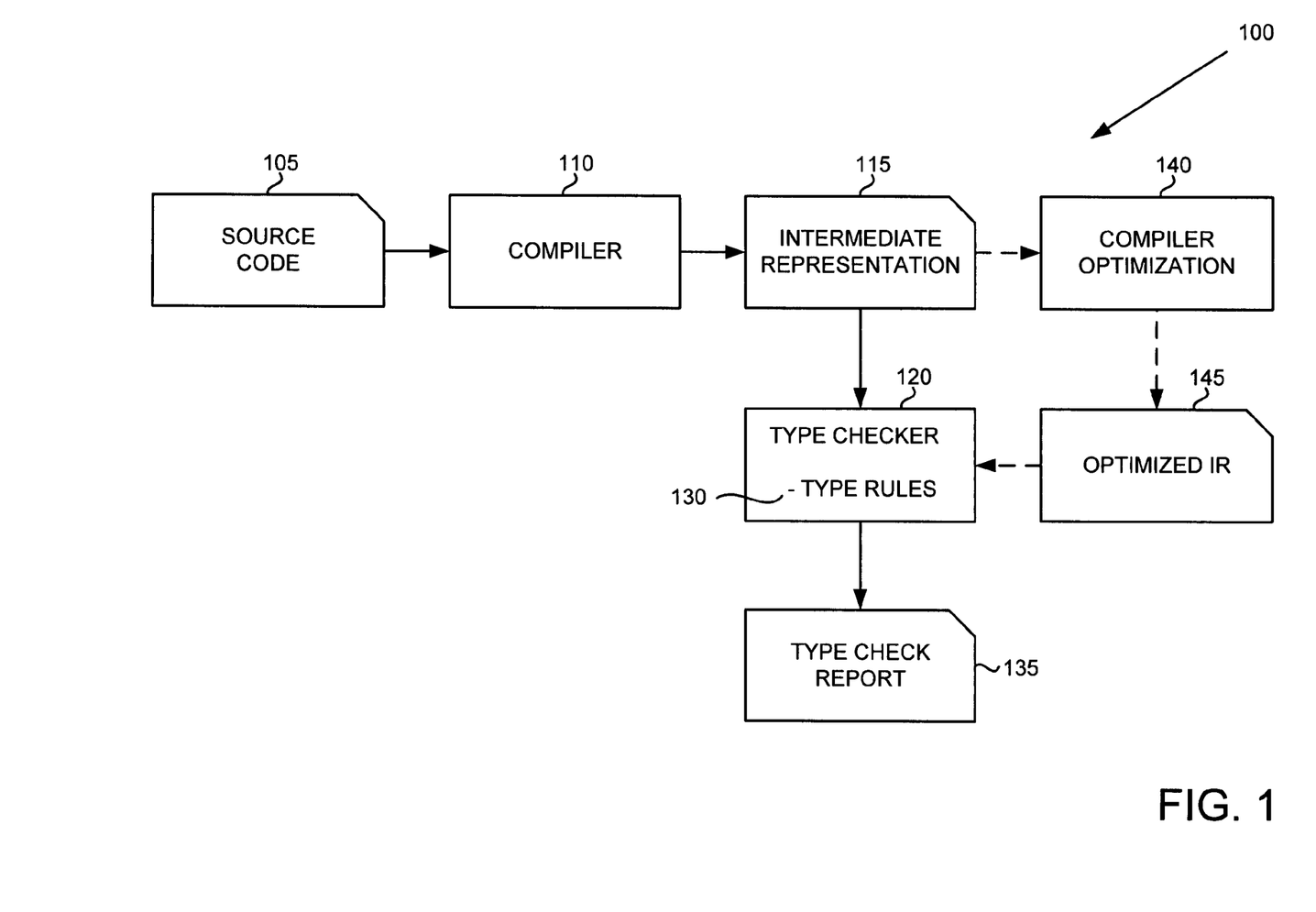
FIG. 1 is a block diagram illustrating an exemplary system for generating a typed intermediate representation of a computer program from its source code representation in an object-oriented language to ensure that the program, in its typed intermediate representation, is type safe.

FIG. 1 illustrates an exemplary overall system 100 for type checking typed intermediate representations of computer code. The system 100 comprises a compiler 110 for compiling a source code representation 105 in an object-oriented language to a corresponding typed intermediate representation 115. The system 100 further comprises a type checker 120, which performs type check analysis of the typed intermediate representation 115. The type check analysis performed by the type checker 120 is according to the type checking rules 130 which are applied to the typed intermediate representation 115. The result of the type checking analysis may be expressed as a type check report 135. Among other things, the type check report 135 may comprise an answer to whether or not portions of code in the intermediate representation 115 have violated one or more typing rules 130. The rules 130 are in part expressed in the form of constructs in a typed intermediate language that preserves the notions of class names and class hierarchies declared in the source code representation 105.

Alternatively, after an initial compilation from the original source code representation 105 to an intermediate representation 115, the compiler optimization processes 140 can be applied to the intermediate representation 115 to further streamline the original source code 105 according to particular target architectures, for instance. Nevertheless, applying the optimizations 140 results in an optimized form 145 of the intermediate representation 1115, which too can be type checked by the type checker 120. In fact, without a typed intermediate representation 115, verifying the type safety of optimizations 140 would be difficult and, in some cases, create unwanted overhead during runtime. The dashed lines connecting optimizations 140 and optimized form 145 of the intermediate representation 115 to the type checker 135 simply indicate that optimizations 140 are not required to be applied to the intermediate representation 115 prior to type checking.

Also, FIG. 1 shows a single intermediate representation 115. However, it is possible to have more than one intermediate representation, such as the one at 115, prior to lowering the program in question to its machine code representation. The principles of the typed intermediate representation described in additional detail below can be applied to any such intermediate representations and any number of such intermediate representations (e.g., 115 in FIG. 1).

Exemplary Overall Methods of Generating Typed Intermediate Representations

Figure 2:
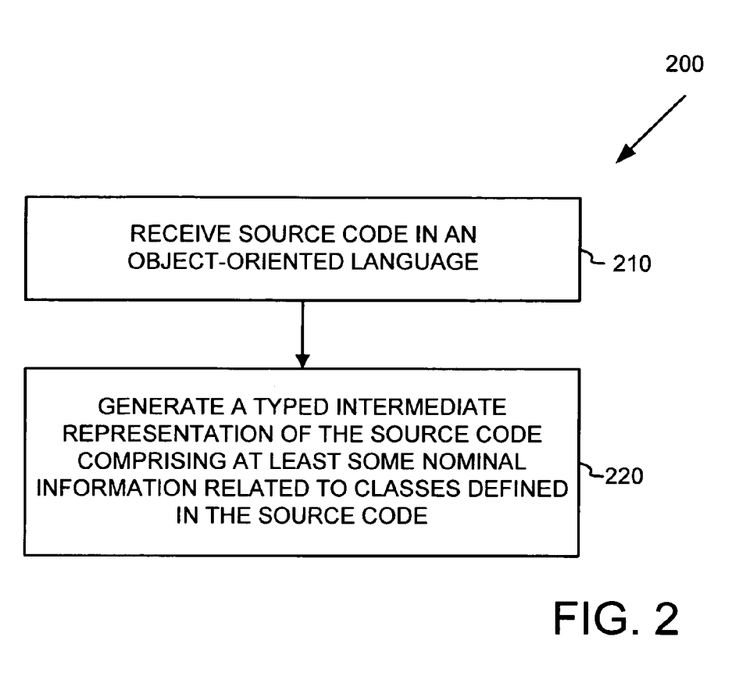
FIG. 2 is an overall method for generating a typed intermediate representation of a computer program from its source code representation in an object-oriented language.

FIG. 2 illustrates an exemplary overall method 200 for generating typed intermediate representations of source code in an object-oriented programming language. Programming models generally known as object-oriented programming provide many benefits that have been shown to increase programmers' productivity. In object-oriented programming, programs are written as a collection of classes each of which models real world or abstract items by combining data to represent the item's properties with functions to represent the item's functionality. More specifically, an object is an instance at runtime of a defined type referred to as a class, which among other things can exhibit the characteristics of data encapsulation, polymorphism and inheritance. Data encapsulation refers to the combining of data (also referred to as fields of an object) with methods that operate on the data (also referred to as member functions of an object) into a unitary software component (i.e., the class), such that the class hides its internal composition, structure and operation and exposes its functionality to client programs that utilize the class only through one or more interfaces. An interface of the class is a group of semantically related member functions of the class. In other words, the client programs do not access the object's data at runtime directly, but must instead call functions on the class's interfaces to operate on the data. Polymorphism refers to the ability to view (i.e., interact with) two similar classes through a common interface, thereby eliminating the need to differentiate between two classes. Inheritance refers to the derivation of different classes from a base class, where the derived classes inherit at least some of their properties and characteristics from the base class.

The source code representation may be any class-based object-oriented programming language models (e.g., C++, JAVA, or C#), wherein at least some code portions classify other code portions based on classes. The classes may be of user-defined classes or of built-in classes, such as string, arrays, etc. One way to make typed intermediate representations, such as 115 (FIG. 1), have decidable typechecking (e.g., 120) is according to the method 200 of FIG. 2, wherein lightweight notions of class names, and any hierarchical relationships declared in a source code representation are preserved in the typed intermediate representation 115 (FIG. 1) instead of being discarded during compilation, while also adding the structure-based information related to the classes, such as the layout of objects that are instances of the class. Among other things, this approach allows the intermediate representation 115 (FIG. 1) to be decidably type checked.

Thus, according to the method 200, at 210, a compiler 110 (FIG. 1) receives a source code representation (e.g., 105) of a computer program written in an object-oriented language (e.g., C#, JAVA, or C++). Further at 220, the source code representation 105 (FIG. 1) is compiled to an intermediate representation (e.g., 115) which comprises at least some class name-based (nominal) information related to classes (e.g., information related to class hierarchy) declared in the source code. Thus, the class name-based information is retained in the intermediate representation while also adding the structure-based information related to the data representation of the objects at runtime (e.g., layout where layout is the organization in memory of its fields, methods, etc.). Retaining the class name-based information of the source code representation allows a compiler to express name-based sub-classing relationships of classes in the intermediate representation for type checking purposes. Furthermore, such sub-classing relationships based on class names can then be expressed separately from the structure-based sub-typing relationships.

Among other things, expressing sub-classing relationships and hierarchies in a name-based form simplifies the process of type checking at compile time because in-part, bounds for applying type checking rules expressed in terms of name-based sub-classing relationships are decidable unlike the rules that rely on structure-based sub-typing relationships.

Exemplary Typing of Classes in an Intermediate Representation

Class types in the typed intermediate representation (e.g., 115 at FIG. 1) are expressed in terms of class names. The class name-based class hierarchy expressed in the source code representation (e.g., 105 at FIG. 1) is also retained in the intermediate representation. Additionally, a second representation of classes uses record types and can express structure-based sub-typing while retaining their relationship to the class name-based information. In short, portions of the intermediate representation (e.g., 115 at FIG. 1) such as expressions and variables, are typed in terms of a class name-based type that represents that the values that those portions such as expressions or variables may have at runtime are objects that are precisely of the type referenced by the class name. Thus, unlike in a typical source code representation, class names in the typed intermediate representation 115 (FIG. 1) are used precisely to indicate that a variable, expression, or other code portion of the intermediate representation has values at runtime that are objects of the particular class. Thus, class names are not used loosely to refer to a dynamic type of the object, which may be unknown at compile time and may later be ascertained to be a particular class or one of its sub-classes.

In addition to a precise class name-based type, classes in the intermediate representation 115 at FIG. 1 are also represented in terms of corresponding record types that represent the layout of objects that instances of that class at runtime (e.g., where layout is the organization in memory of its fields, methods, etc.). When needed, objects that have a class name-based type can be coerced to records of the corresponding record type. Keeping class name-based type information and its corresponding structure-based object layout information has a low cost, because interesting work, such as field fetching, method invocation and cast, is done on records types.

Retaining a class name-based type and using a structure-based record type to express object layout in an intermediate representation simplifies a type system for the intermediate representation. First, structural recursive types are not necessary because each record type can refer to any class name, including the class to which the record type corresponds. Second, it simplifies the bounded quantification that is needed to express inheritance because the bounds for type variables can be specified in terms of sub-classing not sub-typing, as in traditional bounded quantification. Expressing the bounds in class names, as opposed to arbitrary structural types, results in decidable type checking.

Figure 3:
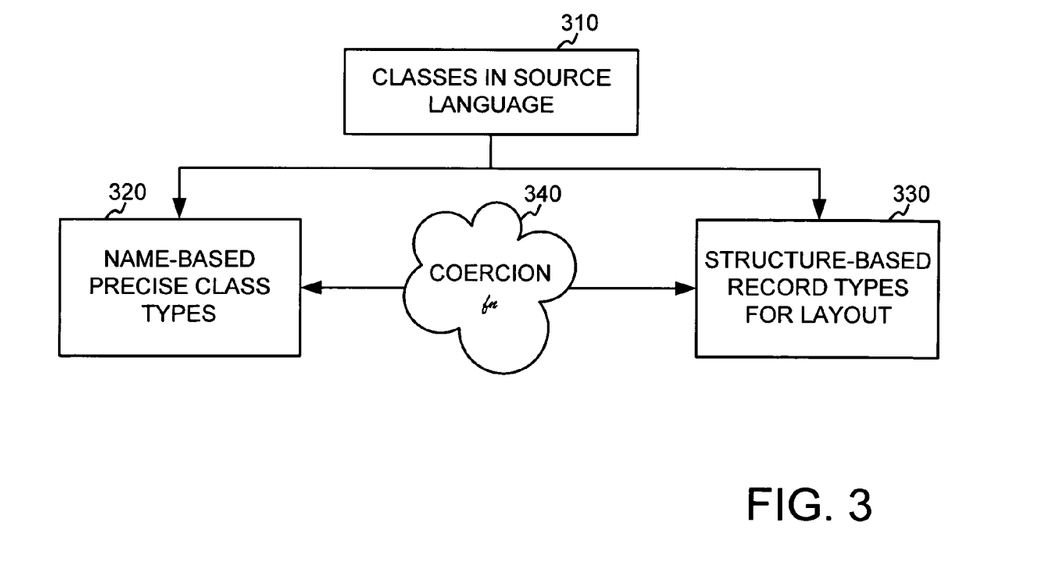
FIG. 3 is a block diagram illustrating an exemplary form of classes in an exemplary intermediate representation of a computer program coded in an object-oriented language.

FIG. 3 illustrates this concept of retaining class name-based information for expressing class types in an intermediate representation, which can be expressed independently of the related structure-based record type. In FIG. 3, class types declared originally in a source code language 310 are expressed in the typed intermediate representation 115 at FIG. 1 as a class name-based type 320 that precisely refers to objects of the particular class name in the intermediate representation. Each such precise class name in the intermediate representation 115 at FIG. 1 also has a corresponding structure-based record type 330 for expressing the structure-based information related to the layout associated with the class including its data fields, virtual methods, etc. Coercion functions 340 can be used to coerce between records of the structure-based record type 330 and objects of the name-based type 320. For instance, if a particular data field needs to be accessed, then objects of the name-based type 320 is coerced to records of the corresponding structure-based record type 330 and the data field of interest can be accessed via the record type 330.

Figure 4:
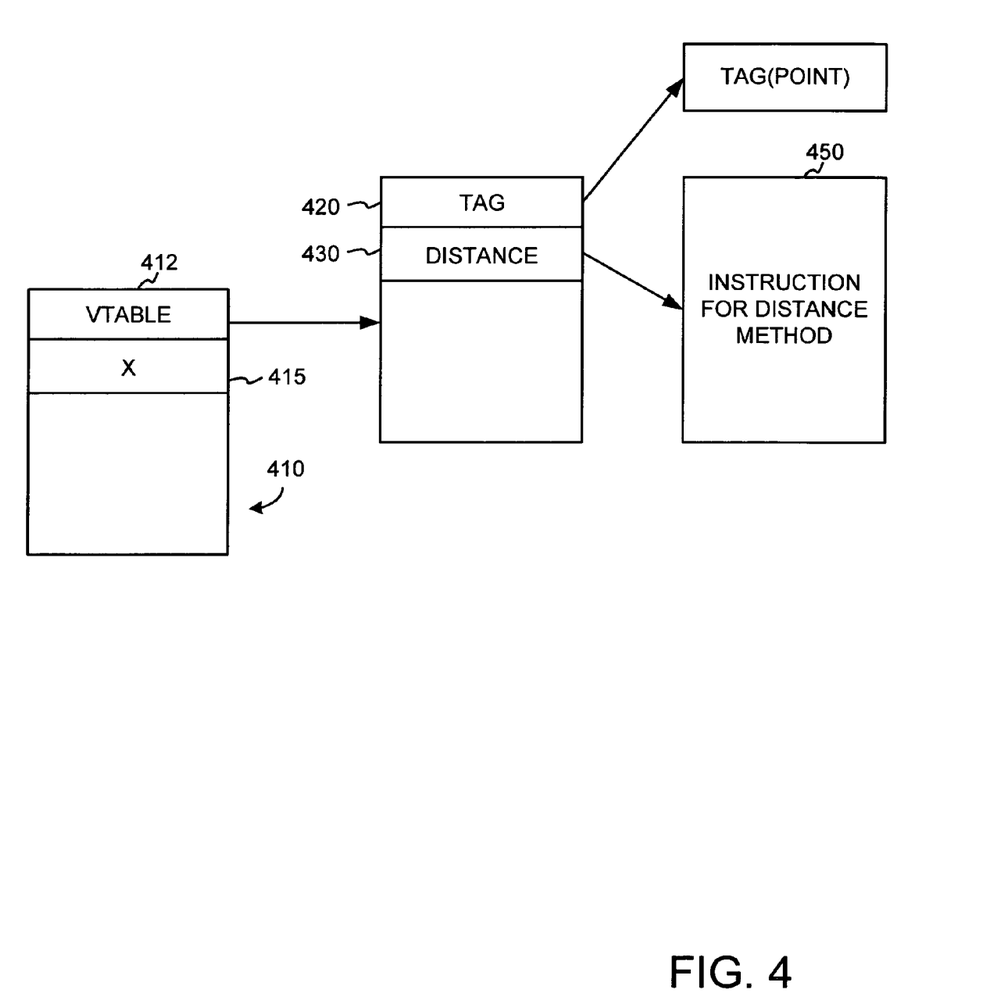
FIG. 4 is a block diagram illustrating an exemplary object layout represented by an exemplary structure-based record type in the typed intermediate representation including data fields and virtual methods.

Exemplary Structure-based Record Type Related to a Class Name-based Type in a Typed Intermediate Representation As noted above, classes in a typed intermediate representation are expressed both in terms of their class name-based types and structure-based record types. For instance, each class name "C" has a corresponding record type R(C) that describes its object layout. The object layout may comprise, for instance, the organization of fields, methods, and runtime tags. R(C) specifies the layout of an object of "C," including the fields and methods from "C's" super classes. The following example of class Point and its associated record type R(Point) is illustrated as shown in FIG. 4. The source code in an object-oriented programming language for the exemplary class Point is as follows.

Class Point { int x;

int distance ( ){ . . . }}

As shown in FIG. 4, in one embodiment, an object layout 410 of class Point contains a vtable 412 of class Point and fields (e.g., of variable "x" at 415). The vtable 412 is a record that includes a runtime tag 420 for the class Point and function pointers for the virtual methods (e.g., the method distance( ) at 430). The function pointer (e.g., 430) points to the appropriate address location of the instructions related to the distance method 450.

Figure 5A:
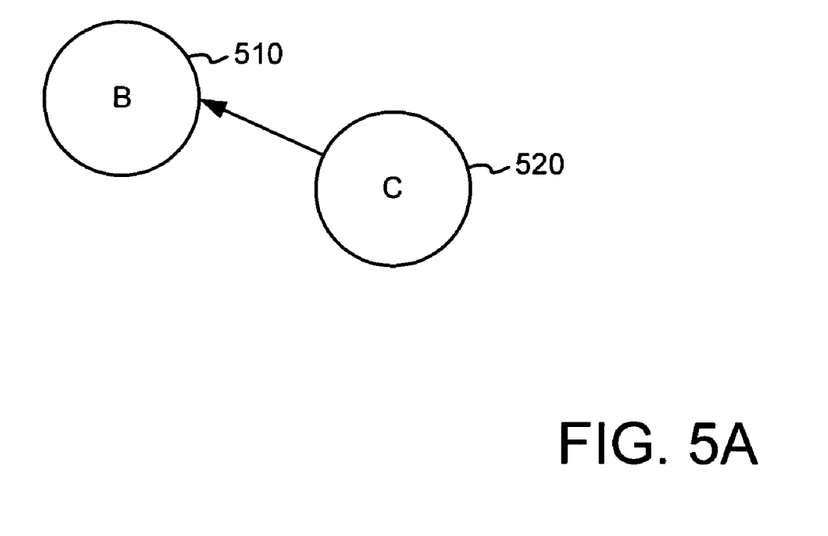
FIG. 5A is a block diagram illustrating a sub-classing relationship between classes of a source code representation in an object-oriented language.
Figure 5B:
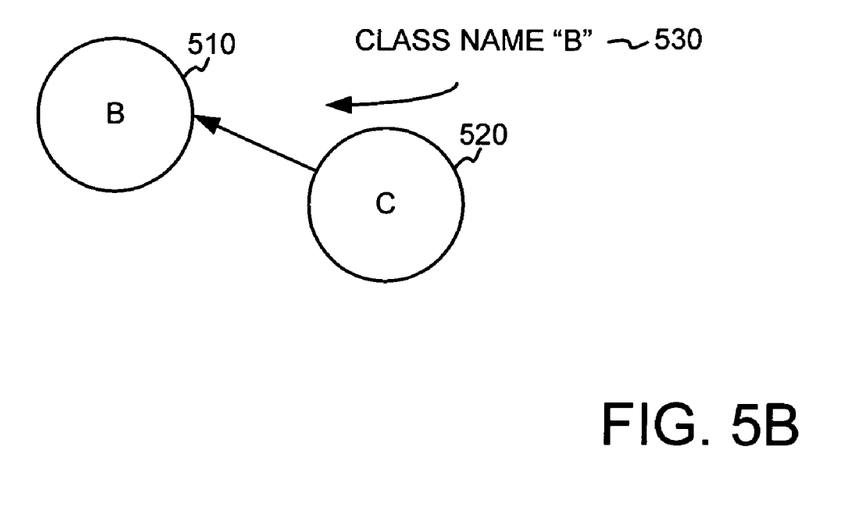
FIG. 5B is a block diagram illustrating the loose use of class names in object-oriented languages to refer to the types of exemplary objects of related classes shown in FIG. 5A.
Figure 6A:
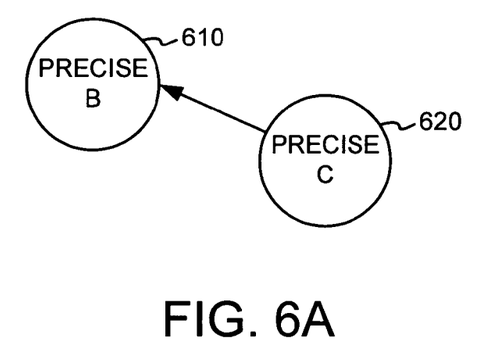
FIG. 6A is a block diagram illustrating a sub-classing relationship between classes in an exemplary typed intermediate representation of source code from an object-oriented language.
Figure 6B:
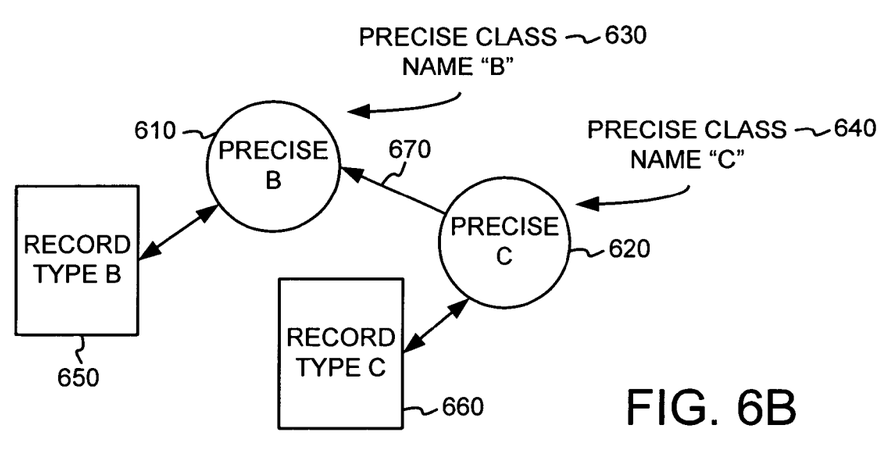
FIG. 6B is a block diagram illustrating the exemplary class names and record types of related classes as shown in FIG. 6A represented by precise class names in an exemplary typed intermediate representation of source code from an object-oriented language.

Exemplary Methods of Precisely Expressing of Classes in a Typed Intermediate Language FIG. 5A illustrates class "B" 510 and class "C" at 520 in a source code representation wherein, according to convention in object-oriented languages (e.g., C#, JAVA, or C++), a type with a class name of "B" 530 (FIG. 5B) refers to objects of class "B" at 510 and any of its sub-classes, such as "C" at 520. However, in the typed intermediate representation 115 (FIG. 1), the class names have a precise notion. Thus, class names "B" and "C" at 610 and 620 (FIG. 6A) are retained in the typed intermediate representation, but the precise class name "B" at 630 (FIG. 6B) refers to objects of class "B" at 610, but not its sub-classes (e.g., "C" at 620). Likewise, precise class name "C" at 640 refers only to objects of type "C" at 620, but not any of its sub-classes (not shown). Such precise notions help in guaranteeing that operations, such as dynamic dispatch and type casts are safe. This is explained in further detail below. Furthermore, as shown in FIG. 6B, each precise class-named based type is associated uniquely with a record type (e.g., 650 for precise class name "B" and 660 for precise class name "C").

Figure 7A:
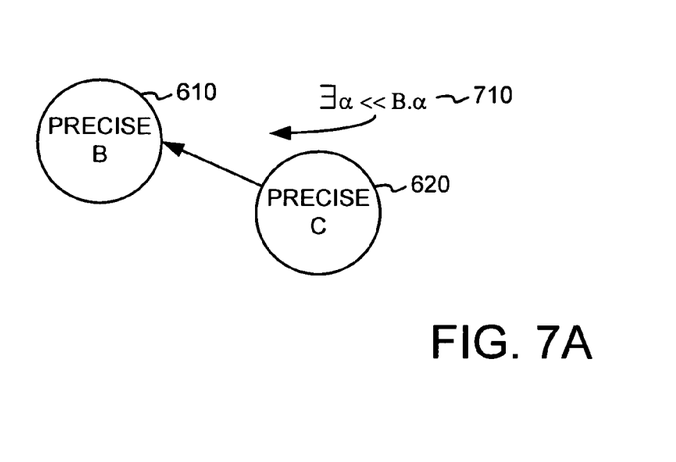
FIG. 7A is a block diagram illustrating an exemplary existential type that binds a type variable identifying the dynamic type of an object.

Exemplary Methods of Expressing Class Inheritances and Dynamic Types in a Typed Intermediate Language Inform of Sub-classing Bounded Quantifications For at least some expressions, variables, and other parts of a program, the precise types of objects that the expressions, etc., may have at runtime are unknown at compile time. This ambiguity surfaces, for example, when source code refers to a class at compile time, but the actual value at runtime is a subclass of the class. Typical source languages allow classes and subclasses to be used interchangeably even though the precise type at runtime is dependent on the execution path, which becomes evident only at runtime. The types of objects that the values of expressions, variables, may have at runtime are called dynamic types. In the typed intermediate representation provided with precise notions of class names, the loose reference of source code class-names cannot be used to refer to the types of objects that are classes or their subclasses. Instead, as shown in FIG. 7A, in the intermediate representation, at 710 a bounded existential type $\exists \alpha<<B.\alpha$ binds a type variable $\alpha$ to abstract the dynamic type of an object whose type (e.g., 610 or 620) is not known at compile time. In this form, the type $\exists \alpha<<B.\alpha$ is used to represent objects of class B or B's sub-classes. The type variable $\alpha$ therefore abstracts the dynamic type at compile time. The typed intermediate representation constrains the values attainable by the type variable (e.g., $\alpha$) by placing sub-classing based bounds (e.g., $\alpha<<B$) on the type variable. The typechecking is made decidable because it is expressed in the form of class names, or other type variables and not structure-based information, such as structure-based sub-typing bounds. For instance, the bounded existential type $\exists \alpha<<B.\alpha$ ensures that it represents only the type of objects of class B or B's sub-classes.

The record types associated with class names also comprise a reference to the bounded existential types such as $\exists \alpha<<B.\alpha$ with sub-classing bounded quantification in order to pack the "this" pointers of virtual methods within. For instance, the exemplary class Point (listed above) has an associated record-type as follows:

R(Point)={vtable:{tag:Tag(Point)

distance: $(\exists \alpha<<Point.\alpha) \rightarrow int$}, x: int}

Thus, the types of virtual methods refer to the dynamic types of their enclosing objects, such as (e.g., the method distance requires an object of type $(\exists \alpha<<Point.\alpha)$ to ensure type safety even at the intermediate language level when the dynamic types of the objects are not certain. In this manner, a type variable (e.g., $\alpha$) connects the object's dynamic type with the "this" pointer (e.g., of type $\exists \alpha<<Point.\alpha$) as in the record above. This is one manner by which type cast and dynamic dispatch are guaranteed safe.

Suppose class Point2D extends class Point as follows:

class Point2D: Point{int y;

int distance( ){ ... y ... }}

The record type R(Point2D) will be as follows:

R(Point2D)={vtable: {tag: Tag(Point2D), distance: $(\exists \gamma<<Point2D.\gamma) \rightarrow int$}, x:int, y:int}

The record type R(Point2D) includes members in Point, but it has its own tag and its own type for the "this" pointer $(\exists \alpha<<Point2D.\alpha)$.

Figure 7B:
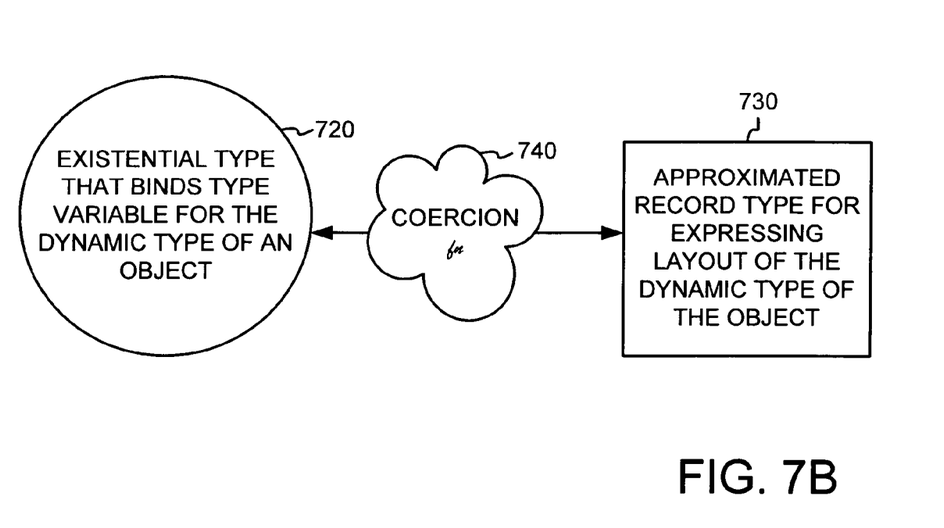
FIG. 7B is a block diagram illustrating an exemplary representation of an existential type that abstracts the dynamic type of objects in a typed intermediate representation and the corresponding record type that approximates the layout of the objects of the dynamic type.

As shown in FIG. 7B, a bounded existential type with sub-classing bounded quantification, such as, $\exists \alpha<<B.\alpha$ at 720, also has a corresponding structure-based approximated record type at 730. The layout of an object of type $\exists \alpha<<B.\alpha$ is approximated by a record that at least comprises all fields and methods declared in class "B." An approximation coercion function 740 is provided to coerce between records of the approximated record type 730 and objects of the associated type variable at 720. The coercions are no-ops at runtime and, thus, introduce no overhead at runtime.

For instance, suppose an exemplary variable "O" has the bounded existential type $\exists \alpha<<Point.\alpha$ (related to the class Point declared above) then the variable "O" may at runtime have a value that is an object of class Point or any sub-class of Point. The layout of all the dynamic types of objects that may be values of "O" at runtime can be approximated at compile time as follows:

ApproxR($\alpha$, Point)={vtable: {tag: Tag($\alpha$), distance: $(\exists \gamma<<\alpha.\gamma) \rightarrow int$}, $x^M$: int}

If at runtime "O" happens to be assigned a value that is an object of class Point2D which is declared above as sub-class of Point then the precise record type of the object will be as follows:

R(Point2D)={vtable: {tag: Tag(Point2D), distance: $(\exists \gamma<<Point2D.\gamma) \rightarrow int$}, x: int,y: int}

Structural sub-typing can be enforced on the typed intermediate representation to ensure that the condition R(Point2D)≦ApproxR(α,Point)[Point2D/α] holds. The two functions R(C) and ApproxR(α,C) need to have knowledge of the layout the compiler chooses for objects. Therefore, the layout information is part of the type system. However, not all typing rules need use the two functions. Thus, the rest of the type system can be independent of the layout strategy. The soundness of the type system only requires that:

(1) ApproxR(α,C)<ApproxR(α,B) if C<<B; and
(2) R(C)≦ApproxR(α,B)[C/α] if C<<B.

Exemplary Methods of Creating Objects, Field Fetching and Virtual Method Invocation of Objects Expressed in a Typed Intermediate Representation To create an object of class Point for instance, a record of type R(Point) is first created and then the record is coerced to an object of class Point. To fetch a field from an object, the object is coerced to a record and the field is fetched from the record. To call a method on an object P of exact class Point, the object P is coerced to a record of type R (Point), the vtable 412 (FIG. 4) is fetched from the record, then the method is fetched from the vtable 412 (FIG. 4), and the object P is passed (after packing it to have existential type ∃α<<Point. α) to the method 450 (FIG. 4). If the dynamic type of the object P is unknown at compile time, a specific type variable can e used to identify P's dynamic type. This ensures there is a unique connection between the type variable and the specific object so that later on the right method is called at runtime. This is important, for instance, to ensure safety of dynamic dispatch and is described in further detail below with reference to an example.

An Exemplary Treatment of Dynamic Dispatch in Typed Intermediate Representation Guaranteed to be Type Safe Dynamic dispatch allows for a sub-class to change one or more virtual methods associated with its super classes. Thus, to ensure type safety of a method call on an object can be a challenge, particularly when, at compile time, it is not known whether the object is of a particular class or one of its sub-classes. The typed intermediate language, as described above, has precise class names and includes type variables and existential types with sub-classing bounds, which ensures safe dynamic dispatch. Consider the following function:

void Test(Point $p_1$, Point $p_2$){vt=$p_1$.vtable;

dist=vt.distance;

dist($p_2$);}

In a language where a class name represents objects of its type and all subtypes, as is typical in source-level languages, this function may be ruled to be type safe. This function is actually unsafe, even though the distance method fetched from $p_1$ requires an object of class Point and $p_2$ is indeed an object of class Point. This function can be called in an unsafe way. For instance, suppose arguments for the Test method, point1 and point2 are declared as follows:

Point point1=new Point2D( . . . );

Point point2=new Point( . . . );

Test(point1, point2);

The new argument point1 is now an object of Point2D. Suppose class Point has been declared as follows:

Class Point {int x;

int distance ( ){ . . . }}

And, suppose sub-class Point 2D extends class Point as follows:

class Point2D: Point{int y;

int distance( ){ . . . y . . . }}

Then the distance( ) method fetched from point1's vtable of class "Point2D" above accesses the field y, which point2 (declared to be of class Point) does not have. A language without a way to express "precise" class types cannot catch such errors.

In the typed intermediate representation described above (e.g., 115 of FIG. 1), if an object $O_1$ has dynamic type τ and its vtable contains a virtual method m, then the type of m in the typed intermediate representation requires an object of type ∃γ<<τ.γ. Thus, only objects of type τ or its sub-classes can be passed to the "this" pointer of the virtual method m. There is a one-to-one relationship between the object $O_1$ and its dynamic type expressed in the typed intermediate representation. In such a typed intermediate representation with exact dynamic types, the exemplary function Test above is translated to an ill-typed function, as follows:

void Test($p_1$: ∃α<<Point. α, $p_2$: ∃β<<Point. β){

(α, $p'_1$)=open($p_1$);

$p''_1$=toRecord($p'_1$);

vt=$p''_1$.vtable;

dist=vt.distance;

dist($p_2$); //ill-typed!}

As listed above, the existential open ( ) function is applied to the $p_1$. Through the open ($p_1$) operation, a new type variable a with a sub-classing bound Point is introduced to identify the dynamic type of $p_1$ and object $p'_1$ has been assigned type variable α. Object $p_2$ is of type variable ∃β<<Point. β and, thus, does not have this type ∃δ<<α.δ, which contains a which is only generated when open ($p_1$) is performed on the particular object $p_1$. For instance, open ($p_2$) will bind some other type variable which is syntactically different. Thus, the one-to-one relationship between the exact dynamic type of an object and the object itself is maintained and dynamic dispatch is made safe.

Figure 8:
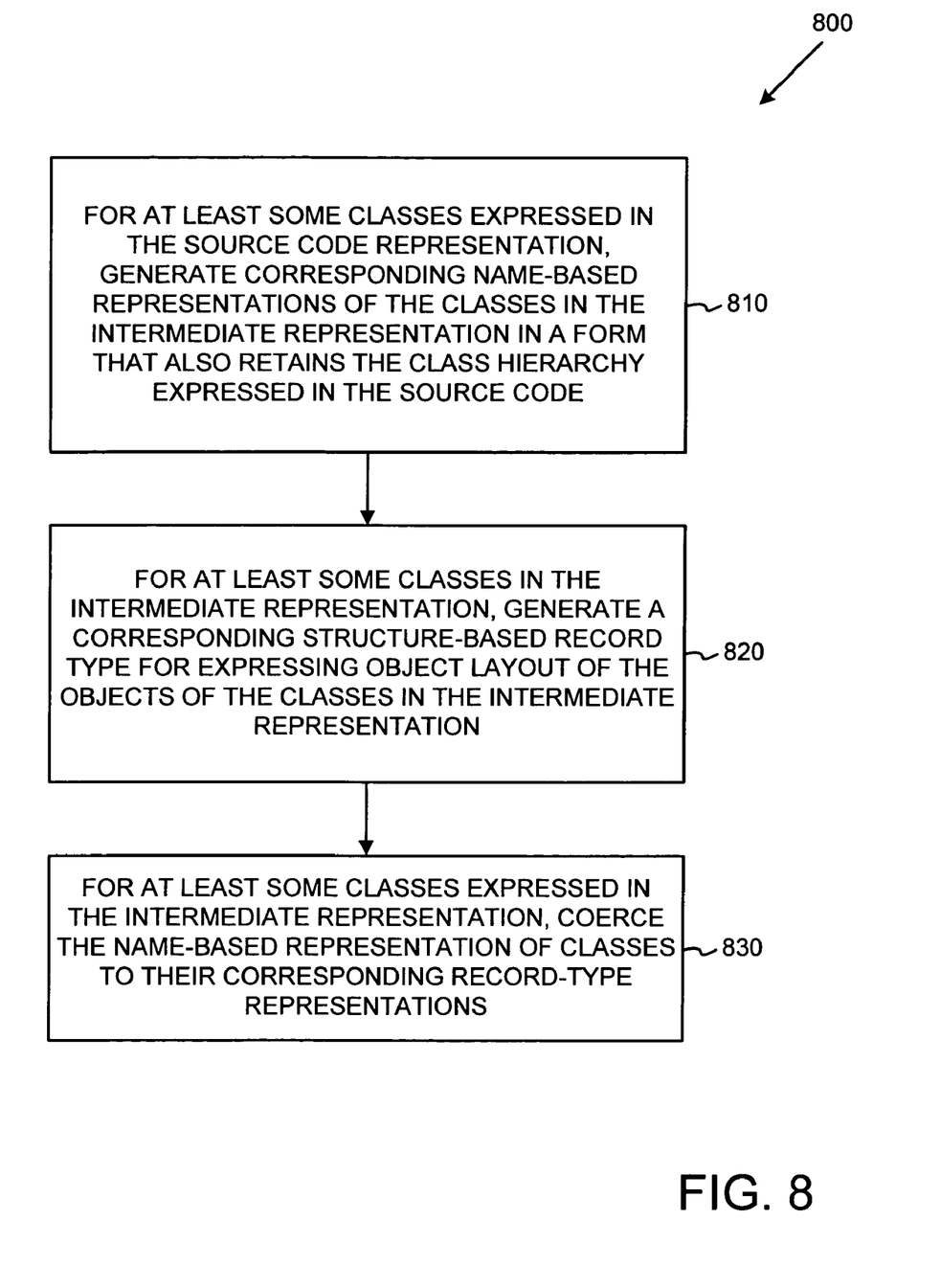
FIG. 8 is a flow diagram illustrating a method for compiling a source code representation in an object-oriented language to an exemplary typed intermediate representation by retaining notions of classes and relationships between various classes from the source code representation.

An Exemplary Method of Compiling a Source Code Representation of an Object-Oriented Language to a Typed Intermediate Representation FIG. 8 describes an exemplary method 800 for compiling a source code representation of an object-oriented language to a typed intermediate representation, as shown for instance with reference to FIG. 3. The source code representation may be any object-oriented language (e.g., C++, JAVA and C#) wherein at least some code portions classify other code portions based on classes. The classes may be user-defined classes or built-in classes, such as string, arrays, etc. Nevertheless, for instance, a compiler (e.g., 110 at FIG. 1), at 810, compiles a source code representation to generate a typed intermediate representation 115 (FIG. 1) comprising class name-based representations of classes, while also retaining information related to the hierarchy of classes provided in the source code representation. Furthermore, at 820, the source code representation is also compiled to generate structure-based record types (e.g., object layout 400 at FIG. 4) for expressing layouts of objects of the name-based representations. Further at 830, coercion functions (e.g., 340 of FIG. 3) are generated to coerce between objects of the class name-based representations of the classes and records of the structure-based representations of the classes. As noted above, coercion functions (e.g. 330 in FIG. 3 and 740 in FIG. 7B) can be used to provide access to fields, methods, and other members of an object.

Figure 9A:
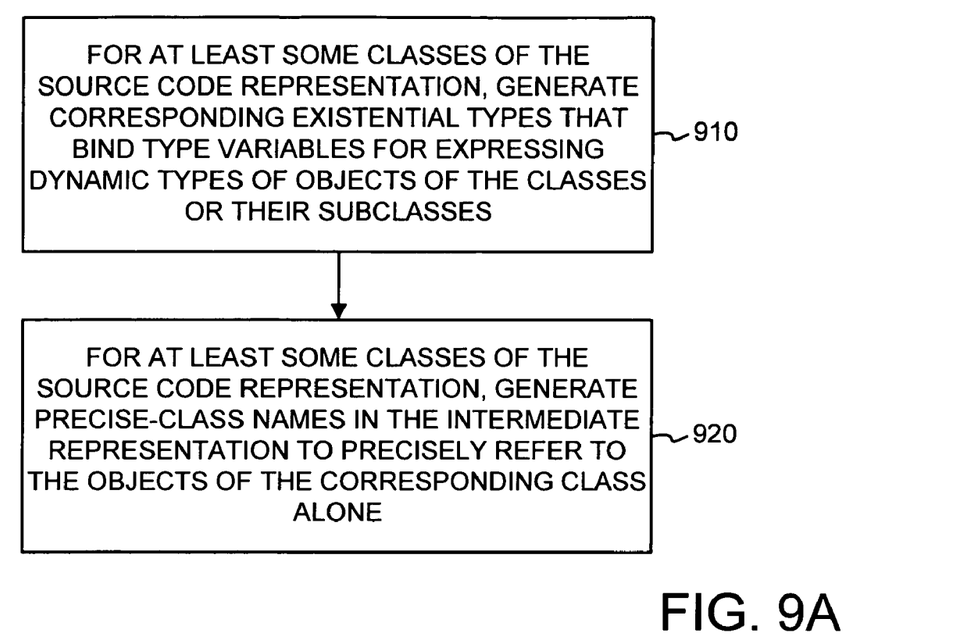
FIG. 9A is a flow diagram illustrating one method for retaining notions of classes and relationships between various classes from the source code representation in a typed intermediate representation including existential types that abstract dynamic types of objects in a typed intermediate representation.

Exemplary Methods of Generating Class Name-Based Representations of Classes in a Typed Intermediate Language FIG. 9A describes one method for generating class name-based representations of classes in a typed intermediate representation. For instance, at 910, the compiler (e.g., 110 of FIG. 1), generates existential types with type variables bounded by sub-classing bounds for expressing dynamic types of objects in the typed intermediate representation at compile time. Also, at 920, the compiler 110 (FIG. 1) generates precise class names to precisely refer to objects of a class (e.g., as described with reference to FIG. 6A). These precise class-names may be used for setting the sub-classing bounds (e.g., $\exists \beta <<$ Point. B), for instance. The precise class names in the intermediate representation may retain the syntax of the class name from the source code declaration, but they cannot loosely refer to the class names to represent types of objects of that class and its sub-classes (e.g., as in FIG. 5B). Alternatively, the compiler 110 (FIG. 1) may assign a precise class name in the intermediate representation 115 (FIG. 1) that is syntactically different from the class name in the source code 105 (FIG. 1).

Figure 9B:
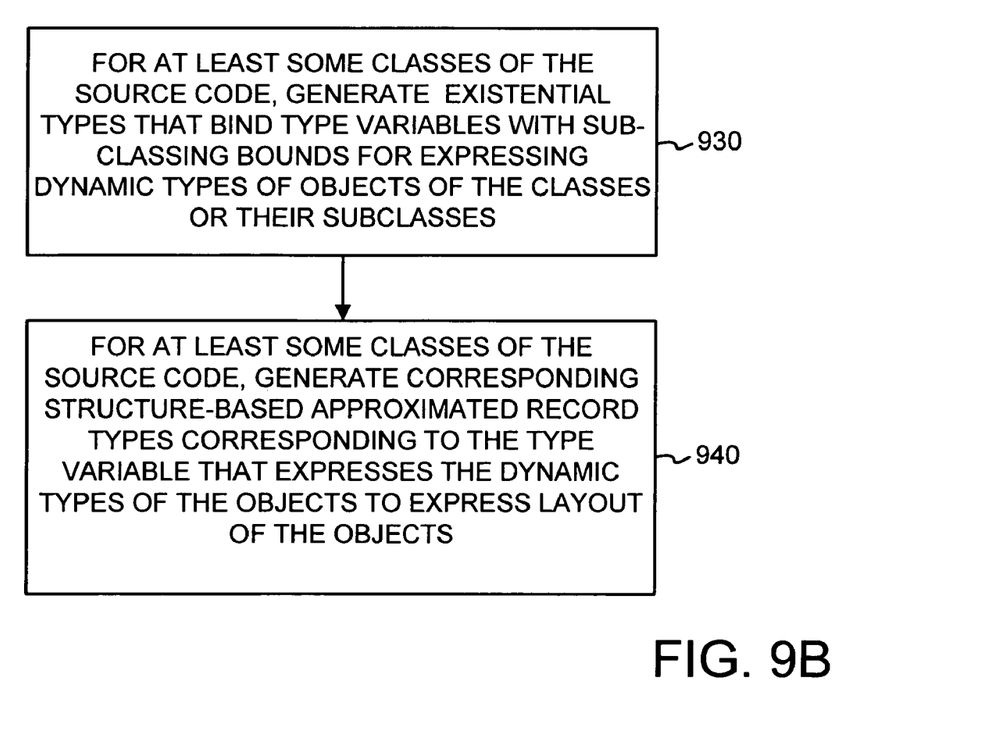
FIG. 9B is a flow diagram illustrating one method for representing existential types referring to dynamic types of objects in a typed intermediate representation.

Exemplary Methods for Generating Existential Types that Bind Type Variables with Sub-classing Bounds for Representing Dynamic Types of Objects in a Typed Intermediate Representation FIG. 9B describes one method for generating existential types that bind type variables with sub-classing bounds in type variables (e.g., in FIG. 7A) for expressing dynamic types of objects in a typed intermediate representation. At 930, an existential type that binds a type variable with sub-classing bounds is generated to express objects whose dynamic types are unknown at compile time (e.g., $\exists \alpha <<$ B.$\alpha$ in FIG. 7A). Also, at 940, an approximated record type is also generated to describe the approximated layout of the object of that dynamic type, which is at least partially based on the layout of objects of the precise class from which it originated (e.g., Approx R($\alpha$, C) is an approximated record type of $\alpha$, if $\alpha$ is a type variable such that $\alpha <<$ C). The compiler 110 (FIG. 1) will also generate coercion functions (e.g., 330 in FIG. 3 and 740 in FIG. 7B) to coerce between objects of the name-based existential type variable and records of the structure-based record type of the existential type variable. As noted above, objects can be coerced to records for such operations as field fetching and method invocation.

Exemplary Computing Environment

Figure 10:
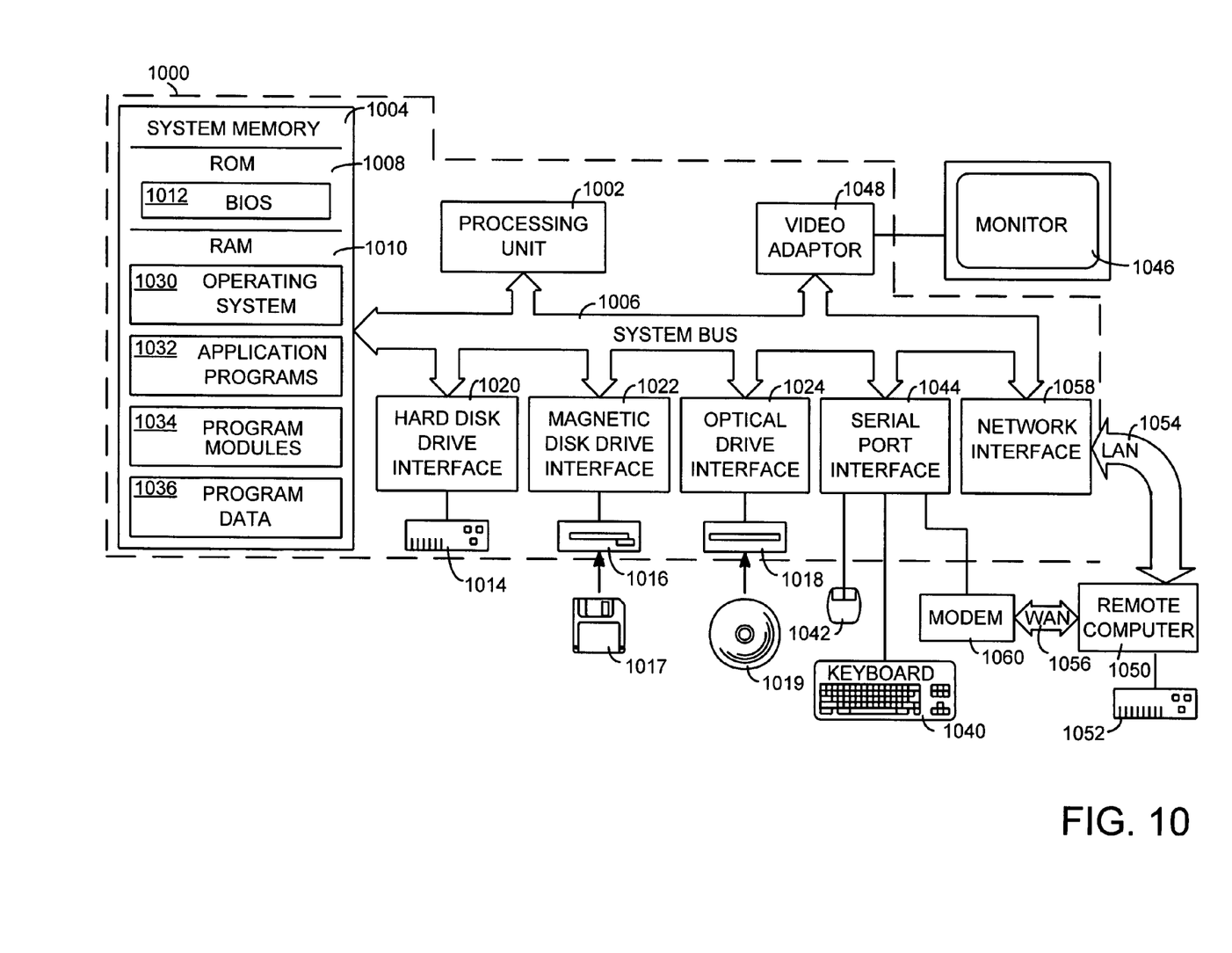
FIG. 10 is a diagram depicting a general-purpose computing device constituting an exemplary system for implementing the disclosed technology.

FIG. 10 and the following discussion are intended to provide a brief, general description of an exemplary computing environment in which the disclosed technology may be implemented. Although not required, the disclosed technology was described in the general context of computer-executable instructions, such as program modules, being executed by a personal computer (PC). Generally, program modules include routines, programs, objects, components, data structures, etc., that perform particular tasks or implement particular abstract data types. Moreover, the disclosed technology may be implemented with other computer system configurations, including hand-held devices, multiprocessor systems, microprocessor-based or programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules may be located in both local and remote memory storage devices.

With reference to FIG. 10, an exemplary system for implementing the disclosed technology includes a general purpose computing device in the form of a conventional PC 1000, including a processing unit 1002, a system memory 1004, and a system bus 1006 that couples various system components including the system memory 1004 to the processing unit 1002. The system bus 1006 may be any of several types of bus structures including a memory bus or memory controller, a peripheral bus, and a local bus using any of a variety of bus architectures. The system memory 1004 includes read only memory (ROM) 1008 and random access memory (RAM) 1010. A basic input/output system (BIOS) 1012, containing the basic routines that help with the transfer of information between elements within the PC 1000, is stored in ROM 1008.

The PC 1000 further includes a hard disk drive 1014 for reading from and writing to a hard disk (not shown), a magnetic disk drive 1016 for reading from or writing to a removable magnetic disk 1017, and an optical disk drive 1018 for reading from or writing to a removable optical disk 1019 (such as a CD-ROM or other optical media). The hard disk drive 1014, magnetic disk drive 1016, and optical disk drive 1018 are connected to the system bus 1006 by a hard disk drive interface 1020, a magnetic disk drive interface 1022, and an optical drive interface 1024, respectively. The drives and their associated computer-readable media provide nonvolatile storage of computer-readable instructions, data structures, program modules, and other data for the PC 1000. Other types of computer-readable media which can store data that is accessible by a PC, such as magnetic cassettes, flash memory cards, digital video disks, CDs, DVDs, RAMs, ROMs, and the like, may also be used in the exemplary operating environment.

A number of program modules may be stored on the hard disk 1014, magnetic disk 1017, optical disk 1019, ROM 1008, or RAM 1010, including an operating system 1030, one or more application programs 1032, other program modules 1034, and program data 1036. A user may enter commands and information into the PC 1000 through input devices, such as a keyboard 1040 and pointing device 1042 (such as a mouse). Other input devices (not shown) may include a digital camera, microphone, joystick, game pad, satellite dish, scanner, or the like. These and other input devices are often connected to the processing unit 1002 through a serial port interface 1044 that is coupled to the system bus 1006, but may be connected by other interfaces, such as a parallel port, game port, or universal serial bus (USB) (none of which are shown). A monitor 1046 or other type of display device is also connected to the system bus 1006 via an interface, such as a video adapter 1048. Other peripheral output devices, such as speakers and printers (not shown), may be included.

The PC 1000 may operate in a networked environment using logical connections to one or more remote computers, such as a remote computer 1050. The remote computer 1050 may be another PC, a server, a router, a network PC, or a peer device or other common network node, and typically includes many or all of the elements described above relative to the PC 1000, although only a memory storage device 1052 has been illustrated in FIG. 10. The logical connections depicted in FIG. 10 include a local area network (LAN) 1054 and a wide area network (WAN) 1056. Such networking environments are commonplace in offices, enterprise-wide computer networks, intranets, and the Internet.

When used in a LAN networking environment, the PC 1000 is connected to the LAN 1054 through a network interface 1058. When used in a WAN networking environment, the PC 1000 typically includes a modem 1060 or other means for establishing communications over the WAN 1056, such as the Internet. The modem 1060, which may be internal or external, is connected to the system bus 1006 via the serial port interface 1044. In a networked environment, program modules depicted relative to the personal computer 1000, or portions thereof, may be stored in the remote memory storage device 1052. The network connections shown are exemplary, and other means of establishing a communications link between the computers may be used.

ALTERNATIVES

Having described and illustrated the principles of our invention with reference to the illustrated embodiments, it will be recognized that the illustrated embodiments can be modified in arrangement and detail without departing from such principles.

Elements of the illustrated embodiment shown in software may be implemented in hardware and vice versa. Also, the technologies from any example can be combined with the technologies described in any one or more of the other examples.

In view of the many possible embodiments to which the principles of the invention may be applied, it should be recognized that the illustrated embodiments are examples of the invention and should not be taken as a limitation on the scope of the invention. For instance, various components of systems and tools described herein may be combined in function and use. We, therefore, claim as our invention all subject matter that comes within the scope and spirit of these claims.

We claim:

1. A computer implemented method for generating a typed intermediate representation of a computer program, the method comprising:
    receiving a source code representation of the computer program in an object-oriented language, the source code representation comprising code portions related to defining one or more classes; and
    based on the source code representation, generating the typed intermediate representation of the computer program comprising at least some class name-based information which retains a class name-based class hierarchy expressed in the source code representation related to the one or more classes defined in the source code representation along with at least some structure- based information related to the one or more classes defined in the source code representation, by generating a class name-based representation of at least one of the one or more classes defined in the source code, and generating a corresponding structure-based record type representation of the at least one of the one or more classes defined in the source code;
    wherein generating the typed intermediate representation of the computer program further comprises:
        generating one or more coercion functions to coerce between objects of the class name-based representation of the class and records of the corresponding structure-based record type representation of the class; and
        generating an existential type that binds a type variable with sub-classing bounds, wherein the type variable represents an exact dynamic type corresponding to the at least one of the one or more classes defined in the source code.

2. The method of claim 1, wherein the class name-based representation of the class type comprises an intermediate precise class name for precisely referring to the class type.

3. The method of claim 1, wherein the structure-based record type representation of the class comprises a layout of the at least one of the one or more classes including one or more members comprising at least one data field.

4. The method of claim 1, wherein the structure-based record type representation of the class comprises a layout of the at least one of the one or more classes including at least one virtual method.

5. The method of claim 1, wherein the structure-based record type representation of the class comprises a layout of the at least one of the one or more classes including one or more members whose types refer to a class name.

6. The method of claim 1, wherein generating the existential type that binds the type variable with sub-classing bounds comprises:
    generating the type variable to be uniquely associated with the dynamic type of objects of the at least one of the one or more classes defined in the source code.

7. The method of claim 1, wherein generating the existential type that binds the type variable with sub-classing bounds comprises:
    generating an approximated record type to be associated with the type variable with sub-classing bounds.

8. The method of claim 7, wherein the approximated record type comprises at least one data field and a virtual method whose type includes the type variable bound by the existential type for which the approximated record type was generated.

9. At least one computer-readable medium having stored thereon a typed intermediate representation of a computer program, the typed intermediate representation comprising:
    a class name-based representation of at least one of one or more classes defined in a source code representation of the computer program and the class name-based representation being generated from the source code representation, wherein the name-based representation of the at least one of the one or more classes is based at least in part on a class declaration in the source code representation of the computer program and retains a class name-based class hierarchy expressed in the source code representation;
    a structure-based representation of the at least one of the one or more classes defined in the source code representation of the computer program and the structure-based representation being generated from the source code representation, wherein the structure-based representation of the at least one of the one or more classes and the name-based representation of at least one of the one or more classes are related to each other via one or more coercion functions operating to coerce between objects of the class name-based representation of the class and records of the corresponding structure-based representation of the class; and
    an existential type for binding a type variable with sub-classing bounds and being generated from the source code representation, wherein the type variable represents an exact dynamic type corresponding to the at least one of the one or more classes defined in the source code.

10. The at least one computer-readable medium of claim 9, wherein the typed intermediate representation further comprises a representation of at least one existential type that binds a type variable with sub-classing bounds for representing an exact dynamic type of objects corresponding to the at least one of the one or more classes defined in the source code representation.

11. The at least one computer-readable medium of claim 10, wherein an approximated record type is associated with the type variable with the sub-classing bound.

12. The at least one computer-readable medium of claim 11, wherein the approximated record type associated with the type variable with sub-classing bounds is approximated based on an object layout of a super-class comprised in the sub-classing bounds.

13. The at least one computer-readable medium of claim 11, wherein the approximated record type associated with the type variable with sub-classing bounds comprises one or more virtual methods whose types include the type variable.

14. A computer system including a computer readable medium and a computer processor for generating a typed intermediate representation of a computer program, the computer system comprising:
   a compiler operable for generating the typed intermediate representation from a source ode representation of the computer program, wherein the source code representation comprises definitions of one or more classes; and
   wherein the typed intermediate representation comprises one or more existential types that bind type variables bounded by sub-classing bounds for expressing dynamic types of objects that are instances of the one or more classes defined in the source code, and one or more coercion functions operating to coerce between objects of the class name-based representation of the class and records of the corresponding structure-based representation of the class; and
   wherein the system is further operable for expressing at least one of the one or more classes defined in the source code by a precise intermediate class name which retains a class name-based hierarchy expressed in the source code representation.

15. The system of claim 14, wherein an approximated record type is associated with the type variable bounded by the sub-classing bounds and wherein, the system is further operable for coercing between objects of the type variable and records of the approximated record type.

16. The system of claim 15, wherein the approximated record type is an approximation based on at least one super-class identified in a corresponding one of the sub-classing bounded quantifications.

17. The system of claim 15, wherein the approximated record type comprises at least one virtual method member whose type includes the type variable with which the approximated record type is associated.

18. The system of claim 14 further operable for coercing between objects of the precise intermediate class name and records of the record type associated with the precise intermediate class name.

* * * * *